(12) United States Patent
Wall et al.

(10) Patent No.: US 12,373,809 B2
(45) Date of Patent: Jul. 29, 2025

(54) SYSTEMS AND METHODS FOR READER DEVICE REGISTRATION, USE AND MANAGEMENT

(71) Applicant: Stripe, Inc., South San Francisco, CA (US)

(72) Inventors: Jonathan Wall, San Francisco, CA (US); Ross Favero, Berkeley, CA (US); Eric Nelson Glass, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 18/914,532

(22) Filed: Oct. 14, 2024

(65) Prior Publication Data

US 2025/0037098 A1    Jan. 30, 2025

Related U.S. Application Data

(63) Continuation of application No. 17/891,707, filed on Aug. 19, 2022, now Pat. No. 12,118,529, which is a
(Continued)

(51) Int. Cl.
*G06Q 20/20*      (2012.01)
*G06Q 20/34*      (2012.01)
(Continued)

(52) U.S. Cl.
CPC ......... *G06Q 20/20* (2013.01); *G06Q 20/3576* (2013.01); *G06Q 20/3829* (2013.01);
(Continued)

(58) Field of Classification Search
None
See application file for complete search history.

(56) References Cited

U.S. PATENT DOCUMENTS

| | | |
|---|---|---|
| 4,403,220 A | 9/1983 | Donovan |
| 5,396,558 A | 3/1995 | Ishiguro et al. |

(Continued)

FOREIGN PATENT DOCUMENTS

| | | |
|---|---|---|
| DE | 10037217 A1 | 2/2002 |
| JP | 2010-529932 A | 9/2010 |

(Continued)

OTHER PUBLICATIONS

Smart Car Alliance, "Security of Proximity Mobile Payments" May 2009 (Year: 2009).*

(Continued)

*Primary Examiner* — Patrick McAtee
*Assistant Examiner* — Jason B Fenstermacher
(74) *Attorney, Agent, or Firm* — Womble Bond Dickinson (US) LLP

(57) ABSTRACT

Embodiments of the invention include a method of performing a payment transaction comprising receiving transaction data by a PIN pad terminal from a point-of-sale terminal, and receiving tender from a customer, by the PIN pad terminal. Tender data and the transaction data are sent to a service gateway, by the PIN pad terminal. The service gateway collects metadata from the tender data and the transaction data. The tender data is sent by the PIN pad terminal to the point-of-sale terminal, which sends the tender data and the transaction data to a merchant gateway for approval or denial of the tender data. The tender data sent to the POS may be encrypted. The service gateway may provide customer and merchant analytics based on the metadata, as well as perform security/fraud checks, BIN management, PIN pad management. Systems are also disclosed.

16 Claims, 11 Drawing Sheets

Related U.S. Application Data continuation of application No. 15/997,416, filed on Jun. 4, 2018, now Pat. No. 11,429,970, which is a continuation-in-part of application No. 15/699,090, filed on Sep. 8, 2017, now Pat. No. 11,562,345.

(60) Provisional application No. 62/514,519, filed on Jun. 2, 2017, provisional application No. 62/385,165, filed on Sep. 8, 2016.

(51) Int. Cl.
    *G06Q 20/38*     (2012.01)
    *G06Q 20/40*     (2012.01)
    *G06Q 20/10*     (2012.01)

(52) U.S. Cl.
    CPC ....... *G06Q 20/4012* (2013.01); *G06Q 20/105* (2013.01); *G06Q 20/34* (2013.01)

(56) References Cited

U.S. PATENT DOCUMENTS

| | | | |
|---|---|---|---|
| 5,529,138 | A | 6/1996 | Shaw et al. |
| 5,629,524 | A | 5/1997 | Stettner et al. |
| 5,649,118 | A | 7/1997 | Carlisle et al. |
| 5,696,577 | A | 12/1997 | Stettner et al. |
| 5,729,717 | A * | 3/1998 | Tamada ............. G06F 12/1441 705/66 |
| 6,133,989 | A | 10/2000 | Stettner et al. |
| 6,362,482 | B1 | 3/2002 | Stettner et al. |
| 6,414,746 | B1 | 7/2002 | Stettner et al. |
| 6,993,503 | B1 | 1/2006 | Heissenbuttel et al. |
| 7,061,372 | B2 | 6/2006 | Gunderson et al. |
| 8,418,689 | B1 | 4/2013 | Davenport |
| 8,478,689 | B1 | 7/2013 | Veselka |
| 8,762,268 | B2 | 6/2014 | Wall et al. |
| 8,910,868 | B1 | 12/2014 | Wade et al. |
| 9,679,290 | B2 | 6/2017 | Hazel et al. |
| 9,753,462 | B2 | 9/2017 | Gilliland et al. |
| 10,366,378 | B1 | 7/2019 | Han et al. |
| 10,372,138 | B2 | 8/2019 | Gilliland et al. |
| 2001/0024171 | A1 | 9/2001 | Nishimura |
| 2002/0003473 | A1 | 1/2002 | Makita et al. |
| 2002/0036907 | A1 | 3/2002 | Kobayashi et al. |
| 2002/0086907 | A1 | 7/2002 | Standke et al. |
| 2002/0111919 | A1 | 8/2002 | Weller et al. |
| 2002/0117340 | A1 | 8/2002 | Stettner |
| 2002/0140923 | A1 | 10/2002 | Schellmann |
| 2004/0004707 | A1 | 1/2004 | Deflumere |
| 2004/0181453 | A1 | 9/2004 | Ray et al. |
| 2005/0033688 | A1 * | 2/2005 | Peart ....................... G07F 7/127 340/5.4 |
| 2005/0068517 | A1 | 3/2005 | Evans et al. |
| 2005/0159974 | A1 | 7/2005 | Moss et al. |
| 2005/0188360 | A1 | 8/2005 | de Jong |
| 2005/0222958 | A1 | 10/2005 | Hasegawa et al. |
| 2005/0256801 | A1 * | 11/2005 | Bucci ....................... G07F 7/08 705/42 |
| 2006/0049255 | A1 | 3/2006 | Von et al. |
| 2006/0179232 | A1 | 8/2006 | Bell et al. |
| 2006/0179323 | A1 | 8/2006 | Nei |
| 2008/0091944 | A1 | 4/2008 | Von et al. |
| 2008/0109372 | A1 | 5/2008 | Bykov et al. |
| 2008/0133136 | A1 | 6/2008 | Breed et al. |
| 2008/0165006 | A1 | 7/2008 | Phillips |
| 2009/0006262 | A1 | 1/2009 | Brown et al. |
| 2009/0228159 | A1 | 9/2009 | Flowers et al. |
| 2010/0051685 | A1 * | 3/2010 | Royyuru ................ G06Q 20/20 235/379 |
| 2010/0108758 | A1 | 5/2010 | Smets et al. |
| 2010/0131413 | A1 | 5/2010 | Kranzley et al. |
| 2010/0191418 | A1 | 7/2010 | Mimeault et al. |
| 2010/0208244 | A1 | 8/2010 | Earhart et al. |
| 2010/0332727 | A1 | 12/2010 | Kapil et al. |
| 2011/0188113 | A1 | 8/2011 | Dede et al. |
| 2011/0264499 | A1 | 10/2011 | Abendroth et al. |
| 2012/0011070 | A1 | 1/2012 | Ward et al. |
| 2012/0072347 | A1 | 3/2012 | Conway |
| 2012/0249999 | A1 | 10/2012 | Stettner et al. |
| 2012/0290420 | A1 | 11/2012 | Close |
| 2013/0185167 | A1 | 7/2013 | Mestré et al. |
| 2013/0304642 | A1 | 11/2013 | Campos |
| 2014/0012701 | A1 | 1/2014 | Wall et al. |
| 2014/0156535 | A1 | 6/2014 | Jabbour et al. |
| 2014/0188646 | A1 | 7/2014 | Itwaru et al. |
| 2014/0207575 | A1 | 7/2014 | Freed-Finnegan et al. |
| 2014/0222668 | A1 | 8/2014 | Wall et al. |
| 2014/0297434 | A1 | 10/2014 | Singhal |
| 2015/0058145 | A1 | 2/2015 | Luciani |
| 2015/0073926 | A1 * | 3/2015 | Royyuru ............ G06Q 20/3574 705/17 |
| 2015/0154634 | A1 | 6/2015 | Chiu et al. |
| 2015/0178708 | A1 | 6/2015 | Reutov |
| 2015/0186864 | A1 | 7/2015 | Jones et al. |
| 2015/0324792 | A1 | 11/2015 | Guise et al. |
| 2016/0117659 | A1 | 4/2016 | Bedier et al. |
| 2016/0328706 | A1 * | 11/2016 | Kennedy .............. G06Q 20/204 |
| 2017/0076288 | A1 | 3/2017 | Awasthi |
| 2017/0091797 | A1 | 3/2017 | Nodera |
| 2017/0186007 | A1 | 6/2017 | Lam |
| 2017/0278085 | A1 | 9/2017 | Anderson et al. |
| 2017/0286663 | A1 | 10/2017 | Hurry et al. |
| 2018/0005226 | A1 * | 1/2018 | Terra .................... G06K 7/0004 |
| 2018/0068138 | A1 | 3/2018 | Palermo |
| 2018/0068303 | A1 | 3/2018 | Wall et al. |
| 2018/0109508 | A1 | 4/2018 | Wall et al. |
| 2018/0167204 | A1 | 6/2018 | Wall et al. |
| 2018/0357634 | A1 | 12/2018 | Shin |
| 2019/0066105 | A1 | 2/2019 | Banks Larsen et al. |
| 2019/0156337 | A1 | 5/2019 | Alandt et al. |
| 2019/0156338 | A1 | 5/2019 | Salama et al. |

FOREIGN PATENT DOCUMENTS

| | | |
|---|---|---|
| KR | 10-2004-0000143 A | 1/2004 |
| KR | 10-2004-0001438 A | 1/2004 |
| KR | 10-2008-0094663 A | 10/2008 |
| KR | 10-2012-0035315 A | 4/2012 |
| WO | 2008/154736 A1 | 12/2008 |

OTHER PUBLICATIONS

Answer to reset, Wikipedia, retrieved from https://en.wikipedia.org/wiki/Answer_to_reset, Apr. 30, 2023, 7 pages.

AU Examination Report in App. No. 2022203463 mailed on May 26, 2023, 3 pages.

Canadian Office Action for Application No. 3035666 dated Apr. 28, 2020, 4 pages.

Decision to grant a European patent received for European Application No. 17849587.5, mailed on Oct. 12, 2023, 2 pages.

Decision to grant received for European Application No. 11838671.3, mailed on Feb. 11, 2021, 2 pages.

EMV, Integrated Circuit Card—Specifications for Payment Systems, Book 2, Security and Key Management, Version 4.3, Nov. 2011, 174 pages.

EMVCo, "A Guide to EMV Chip Technology", Version 2.0, Nov. 2014, 36 pages.

European Search Report and Search Opinion received for EP Patent Application No. 23207568.9, mailed on Jan. 16, 2024, 12 pages.

European Search Report and Search Opinion received for European Application No. 11838671.3, mailed on Mar. 11, 2015, 7 pages.

Examination report received for Australian Patent Application No. 2021293514, mailed on Jul. 2, 2024, 7 pages.

Examination Report received for Australian Patent Application No. 2022203463, mailed on May 8, 2024, 4 pages.

Fabian Meier, "Whitepaper, ax eft Kernel, EMV Level 2 Kernel—a Software Module for EFTPOS Terminals," Abrantix AG, 2009, Mar. 30, 2009, Version v1.0, 16 pages.

Intention to grant received for European Application No. 11838671.3, mailed on Oct. 1, 2020, 6 pages.

(56) References Cited

OTHER PUBLICATIONS

Intention to grant received for European Patent Application No. 17849587.5, mailed on Jan. 25, 2023, 6 pages.
Intention to grant received for European Patent Application No. 17849587.5, mailed on Jun. 5, 2023, 6 pages.
International Preliminary Report on Patentability received for PCT Patent Application No. PCT/US17/50633, mailed on Mar. 21, 2019, 13 pages.
International Preliminary Report on Patentability received for PCT Patent Application No. PCT/US2011/058773, mailed on May 16, 2013, 6 pages.
International Preliminary Report on Patentability received for PCT Patent Application No. PCT/US21/26133, mailed on Dec. 29, 2022, 7 pages.
International Search Report and Written Opinion received for PCT Patent Application No. PCT/US17/50633, mailed on Nov. 29, 2017, 14 pages.
International Search Report and Written Opinion received for PCT Patent Application No. PCT/US2011/058773, mailed on Jun. 29, 2012, 8 pages.
International Search Report and Written Opinion received for PCT Patent Application No. PCT/US21/26133, mailed on Jul. 30, 2021, 8 pages.
Mastercard, "Secure Payment Technologies Demystified", Sep. 2015 (Year: 2015).
Notice of Allowance received for U.S. Appl. No. 17/891,707, mailed on Jul. 8, 2024, 2 pages.
Notice of Allowance received for U.S. Appl. No. 17/891,707, mailed on Jun. 26, 2024, 15 pages.
Office Action received for Australian Patent Application No. 2022203463, mailed on Jan. 8, 2024, 4 pages.
Office Action received for Canadian Patent Application No. 3173110, mailed on Nov. 22, 2023, 5 pages.
Office Action received for European Application No. 11838671.3, mailed on Apr. 17, 2018, 4 pages.
Office Action received for European Application No. 11838671.3, mailed on Feb. 27, 2020, 4 pages.
Office Action received for European Application No. 11838671.3, mailed on Mar. 9, 2017, 4 pages.
Rankl et al: "Smart card handbook, fourth edition" Jul. 19, 2010, pp. ch1-ch2 XP055411264.
Rankl, W., et al., "Smart Card Handbook," Third Edition, Wiley, Apr. 2, 2004, XP055302027.
Request for the Submission of an Opinion received for Korean Patent Application No. 10-2013-7014299, mailed on Feb. 22, 2017, 16 pages (9 pages of English Translation and 7 pages of Original Document).
Srini V P., "A vision for supporting autonomous navigation in urban environments," Computer, IEEE, US, vol. 39, No. 12, Dec. 1, 2006, pp. 68-77.
Supplementary European Search Report and Search Opinion received for European Application No. 17849587.5, mailed on Feb. 25, 2020, 7 pages.
Supplementary European Search Report and Search Opinion received for European Application No. 21825084.3, mailed on May 28, 2024, 9 pages.
Written Decision on Registration received for Korean Patent Application No. 10-2013-7014299, mailed on Aug. 30, 2017, 2 pages of English Translation only.
EMV; Integrated Circuit Card—Specifications for Payment Systems; Book 1; Application Independent ICC to Terminal Interface Requirements; Version 4.3; Nov. 2011, 189 pages.
Examination Report No. 1 for Australian Patent Application No. 2020257022, dated Oct. 13, 2021, 6 pages.
Notice of Acceptance for Australian Patent Application No. 2020257022, dated Feb. 15, 2022, 3 pages.

* cited by examiner

SYSTEMS AND METHODS FOR READER DEVICE REGISTRATION, USE AND MANAGEMENT

RELATED APPLICATION

This application is a Continuation of U.S. patent application Ser. No. 17/891,707, filed Aug. 19, 2022, which is a Continuation of U.S. patent application Ser. No. 15/997,416, filed on Jun. 4, 2018, issued on Aug. 30, 2022, as U.S. Pat. No. 11,429,970, which claims the benefit of U.S. Provisional Patent Application No. 62/514,519, filed Jun. 2, 2017, is assigned to the assignee of the present application, and is incorporated by reference herein. U.S. patent application Ser. No. 15/997,416 is also a Continuation-in-Part of U.S. patent application Ser. No. 15/699,090, filed on Sep. 8, 2017, issued on Jan. 24, 2023, as U.S. Pat. No. 11,562,345, which claims the benefit of U.S. Provisional Patent Application No. 62/385,165, which was filed on Sep. 8, 2016, both of which are assigned to the assignee of the present application and are incorporated by reference herein.

FIELD OF INVENTION

Processing of payment card transactions and, more particularly, processing of payment card transactions in an integrated payment environment, with semi-integrated features.

BACKGROUND OF THE INVENTION

The authorization of a payment card transaction, such as a credit, debit, gift, or electronic benefit card transaction, for example, typically requires multiple steps involving multiple financial institutions, including payment gateways, payment processors, card brands, and issuing banks. Several approaches to processing card transactions at merchant locations, including merchant websites, are known, such as non-integrated and integrated approaches. The processing of card transactions at merchant locations can also use a semi-integrated approach. Payment cards may also be referred to as tender.

FIG. 1 is a schematic representation of an example of a known non-integrated card processing environment. The card processing environment 100 includes a merchant or store of a merchant 102, which includes a point of sale terminal ("POS") 104 and a PIN pad terminal ("PIN pad") 106 at a checkout station. The PIN pad accepts card payments via swiping of the card. Some PIN pads allow for insertion of a smart card so that a chip on the card may be read. PIN pads also receive primary identification numbers or PIN numbers, when necessary. The prices of items to be purchased by a customer are totaled at the POS 104 by a cashier or scanner, for example, to calculate a purchase total or just total. Tender to purchase the items is offered by customer in the form of a credit, debit or gift card, for example, via the PIN pad 104. The card may be swiped or a smart chip card may be inserted, for example. While only one POS 104 and one PIN pad 106 are shown in FIG. 1, it is understood that multiple pairs of POS/PIN pads may be provided at multiple checkout lines at the merchant location.

In the non-integrated environment 100 of FIG. 1, the PIN pad 104 provides tender data or information, also referred to herein as card data information, to the payment processor 106 via a network 108. The network 108 may be the internet for example. The PIN pad 106 and the POS 104 do not communicate with each other. Card data is not provided by the PIN pad 106 to the POS 104 and the total cost of goods is not provided to the PIN pad. The amount to be charged needs to be manually entered into the PIN pad 106 by the cashier operating the POS. In addition, the balances between the POS 104 and the PIN pad 106 need to be separated resolved.

The PIN pad 106 forwards the card information and transaction information (including the total cost of goods and/or item data, for example) to a payment processor 108, which stores transaction data to provide daily, weekly, and/or monthly, summary reports to merchants 102, for example. The payment processor 108 also validates aspects of the data received from the PIN pad 106, as is known in the art.

After validation, the payment processor 108 routes the card data and transaction information to a card brand 112 of the card, such as Visa or MasterCard, for example, via the network 110. The card brand 112 verifies the card number and expiration date, approves or denies the transaction, and performs other operations known in the art. The single card brand 112 shown in FIG. 1 represents the multiple card brands, including Visa, MasterCard, American Express, etc., that could be a part of the environment 100.

If the card data is verified and approved by the card brand 112, the card data and transaction data are routed by the card brand to the issuing bank 114 that issued the card, via the network 110. The issuing bank 114 checks credit limits and performs other operations known in the art. The single issuing bank 114 shown in FIG. 1 represents the multiple issuing banks that could be part of the environment 100 such as JP Morgan Chase, Citibank, Wells Fargo, etc. If the issuing bank 116 approves the transaction, then the issuing bank sends an authorization or approval message back along the chain, to the card brand 112, the payment processor 108, to the PIN pad 106, via the network 110 in each step. The PIN pad 106 then accepts the payment via the card and settles the transaction.

If the payment processor 108, card brand 112, or issuing bank 114 do not verify the card data or authorize the transaction, a denial message is returned along the same chain to the PIN pad 106. The PIN pad 106 will not then accept the card payment, and an alternative form of payment may be requested.

FIG. 2 is schematic representation an example of a known integrated card payment environment 120. In the integrated card payment environment 120, the POS 104 and the PIN pad 106 communicate. In addition, a merchant gateway 122 is provided in communication with the POS 104 and the payment processor 108. All the other components of FIG. 2 are the same as in FIG. 1 and are similarly numbered.

The POS 104 totals items for purchase, as discussed above. The total is provided to the PIN pad 106, which requests payment (tender) from the customer. In this example, card data collected by the PIN pad 106 is provided to the POS 104, which provides the card data to the merchant gateway 122, via the network 110.

The merchant gateway 122 may apply rules specific to the respective merchant 102 concerning whether to accept a tender, for example, and/or applies analytics to the card data and transaction data, for example. Analytics may include the analysis of purchasing date at a merchant location, on a storewide and/or individual basis. Analytics may be used to enhance payment rules engines and/or provide targeted advertisements, offers, and other information to customers, for example. If the card data/transaction data pass the rules of the merchant gateway 122, the merchant gateway forwards the card and transaction data to the payment processor 108, via the network 110, for processing by subsequent components in the environment 120, as described above.

The integrated payments environment 120 provides merchants with increased operational efficiency by ensuring that the POS 104 is always in-sync with the PIN pad 106. In many cases, however, the hardware and software of the POS 104 are not as "security hardened" as the PIN pads 106 alone. Sensitive cardholder data passing through the POS 104 device may therefore be at some risk, and the fully integrated approach has led to large payment card data breaches.

FIG. 3 is an example of a semi-integrated card payment environment 130, in which a payment gateway 132 is provided instead of the merchant processor 122. The semi-integrated payment environment 130 provides the benefits of an integrated payment environment 120 without the associated risk of managing secure cardholder data by the merchant 102, by not providing card data to the POS 104. The PIN pad 106 collects tender, requests authorization via the payment gateway 132, and returns a simple approval to the POS 104. The payment gateway 132 communicates with the payment processor 108 to convey card data and transaction data for approval, in the manner described above. Total balances and/or the process of individual items are synchronized between the POS 104 and the PIN pad 106 though coordinated messaging as the POS checks out items being purchased.

The card data is only provided to the payment gateway 108, which may be highly secure. Point-to-point encryption between the PIN pad 106 and the payment gateway 132 may be built-in. Because sensitive payment data never touches the POS 104, potential points of compromise are reduced and the POS 104 need not conform to PCI compliance rules. This reduces the compliance burden for the merchant 102.

Software on the PIN pad 106 drives the in-store user experience, and the connection with the payment gateway 132 enables a range of value-added services, such as analytics, loyalty rewards, etc., as is known in the art. The payment gateway 108 analyzes the card data and transaction data provides payment gateway services to merchants and other parties in FIG. 1, for example. Payment gateway services may include customer analytic information, device monitoring, alerting, and/or outage notifications, for example. An example of a payment gateway 132 that may be used in the semi-integrated payment environment 130 is provided by Stripe, Inc. San Francisco, California, and Index, Systems, Inc., San Francisco, California, for example.

SUMMARY OF THE INVENTION

It would be advantageous to be able to support an integrated payment environment to provide managed device features without the additional work needed to build an interface to the semi-integrated payment gateway. Many merchants are interesting in the value-added features that may be offered by a semi-integrated payment environment, which does not provide sensitive card data to the POS, remotely manages in-store devices, provides faster EMV transaction times, and/or encryption, for example.

In accordance with an embodiment of the invention, systems and methods for providing a managed integrated payment environment including both a merchant gateway and a service gateway, are disclosed. Card data, in one example, is passed to a POS for approval via the merchant gateway, while a PIN pad communicates with the service gateway to provide additional services. Payment flow is decoupled from management functions.

Embodiments of the invention support a merchant who would prefer not to route transaction traffic via the service gateway for whatever reason, and/or to support a merchant who desires on-device/device management features without the complexity of the integration required for a semi-integrated solution, by decoupling the payment flow from device management functions.

In accordance with an embodiment of the invention, a method of performing a payment transaction is disclosed comprising receiving transaction data from a point-of-sale terminal, by a PIN pad terminal. Tender is received from a customer, by the PIN pad terminal. The PIN pad terminal sends tender data based on the received tender and transaction data to a service gateway, which collects metadata from the tender data and the transaction data. Tender data is also sent by the PIN pad terminal to the point-of-sale terminal, which sends the tender data and the transaction data to a merchant gateway for approval or denial of the tender data.

In one example, the PIN pad terminal encrypts tender data and sends the encrypted tender data to the point-of-service terminal. In another example, the service gateway encrypts the received tender data, sends the encrypted tender data to the PIN pad terminal, and the PIN pad terminal sends the encrypted tender data to the point-of-service terminal.

The Pin pad terminal may derive a bank identification number ("BIN") from the tender data, search a BIN file correlating bank identification numbers with card brands and issuing banks that is stored in memory of the PIN pad terminal for the bank identification number, and associate the bank identification number with the tender data and transaction data. The PIN pad terminal then sends the associated BIN, tender data, and transaction data to the point-of-sale terminal. Updates to the BIN file may be provided to the PIN pad terminal from the service gateway. The service gateway may also provide software updates and/or configuration management tools to the PIN pad terminal In accordance with another embodiment of the invention, a PIN pad terminal is disclosed comprising at least one processing device and memory. The at least one processing device is configured to receive transaction data from a point-of-sale terminal and receive tender from a customer. The at least one processing device is further configured to send tender data based on the received tender and the transaction data to a service gateway, which collects metadata from the tender data and the transaction data. The at least one processing device is further configured to send the tender data to the point-of-sale terminal. The point-of-sale terminal sends the tender data and transaction data to a merchant gateway for approval or denial of the tender data.

The at least one processing device may be configured to encrypt tender data prior to sending it to the PIN pad terminal. In another example, the service gateway encrypts the tender data received from the PIN pad terminal and sends it back to the PIN pad terminal, which sends the encrypted tender data to the point-of-service terminal.

The at least one processing device may be configured to derive a BIN from the tender data, search a BIN file correlating BINs with card brands and issuing banks that is stored in memory of the PIN pad terminal, for the BIN, and associate the BIN with the tender data and transaction data. The at least one processing device is further configured to send the associated BIN, tender information, and transaction data to the point-of-sale terminal. Updates to the BIN file may be provided to the PIN pad terminal from the service gateway. The service gateway may provide software updates and/or configuration management tools from the service gateway. An interface for translating messages from the point-of-sale terminal for at least one processing device may be stored in the memory of the PIN pad terminal.

In accordance with another embodiment of the invention, a system for processing payment transactions comprises a service gateway, a merchant gateway separate from the service gateway, and a PIN pad terminal. The system further comprises a point-of-service terminal configured to total at least one item for purchase by a customer and send transaction data to the PIN pad terminal, including the purchase total. The PIN pad terminal is configured to receive the transaction data from the point-of-sale terminal, receive tender from a customer, send tender data based on the received tender and the transaction data to the service gateway, via a network, and send the tender data to the point-of-sale terminal. The point-of-sale terminal is further configured to send the tender data and the transaction data to the merchant gateway, via a network, for approval or denial of the tender data. The service gateway collects metadata from the tender data and the transaction data.

DETAILED DESCRIPTION

Figure 1:
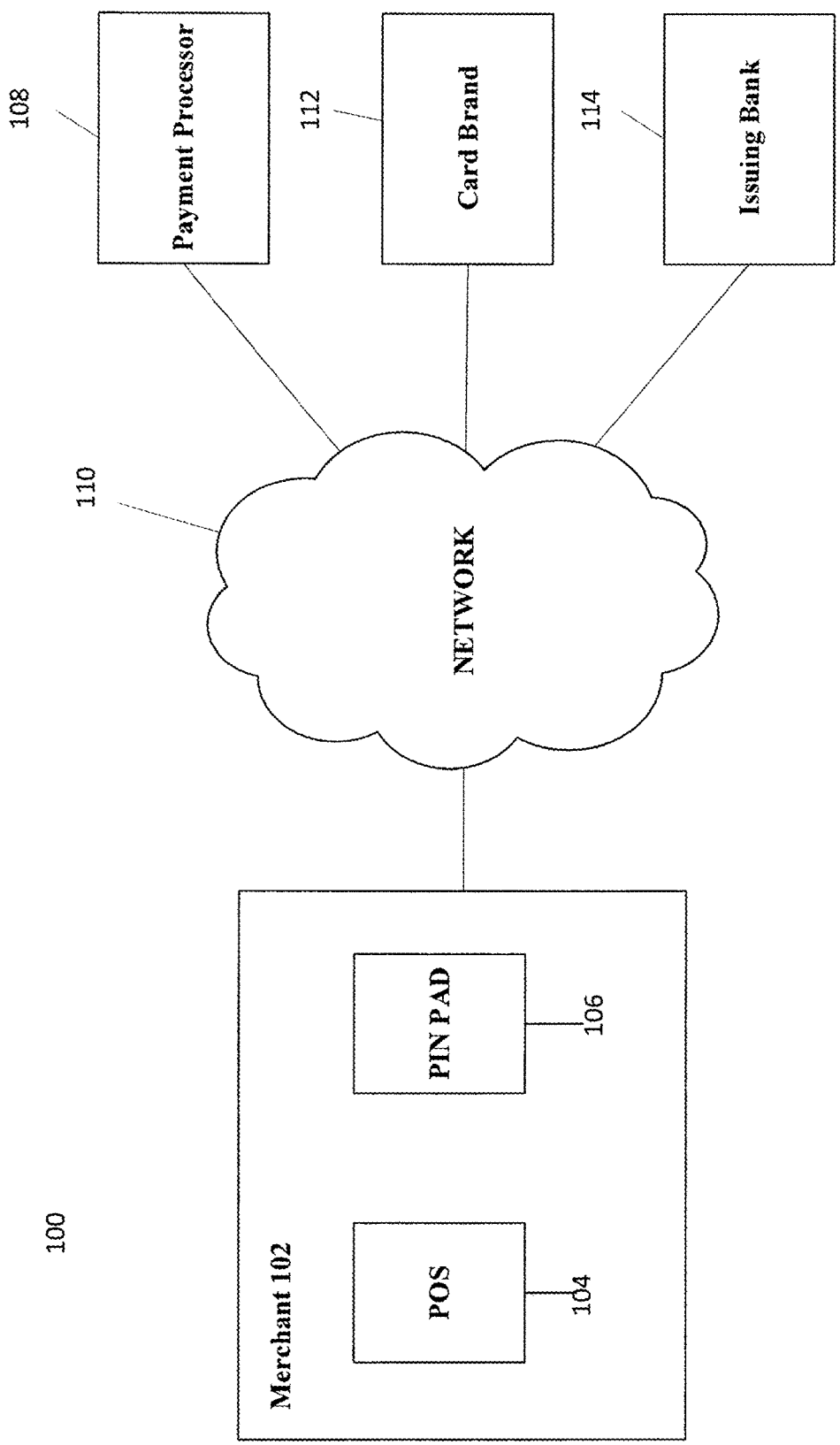
FIG. 1 is a schematic representation of an example of a known non-integrated card processing environment.
Figure 2:
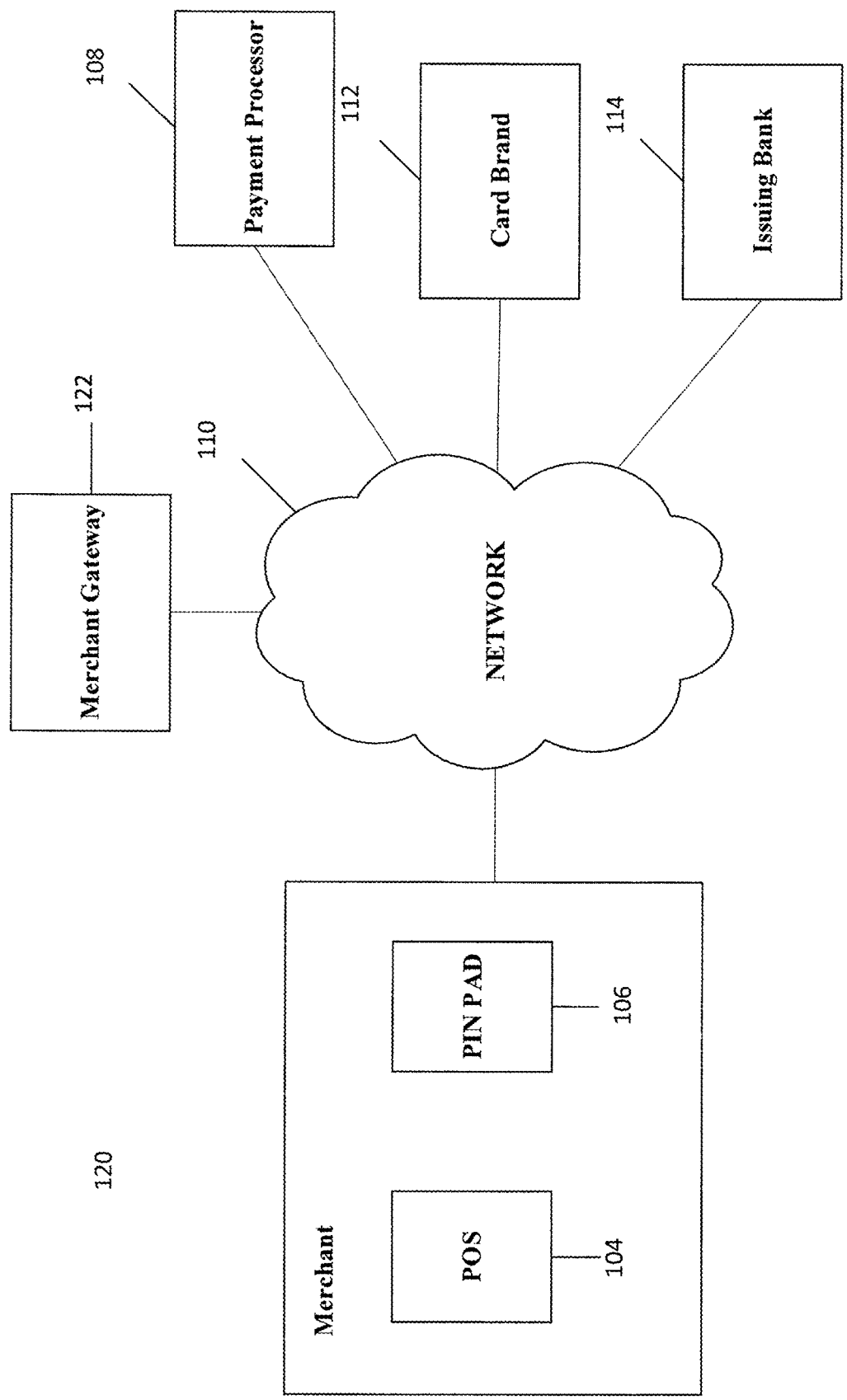
FIG. 2 is schematic representation an example of a known integrated transaction card processing environment.
Figure 3:
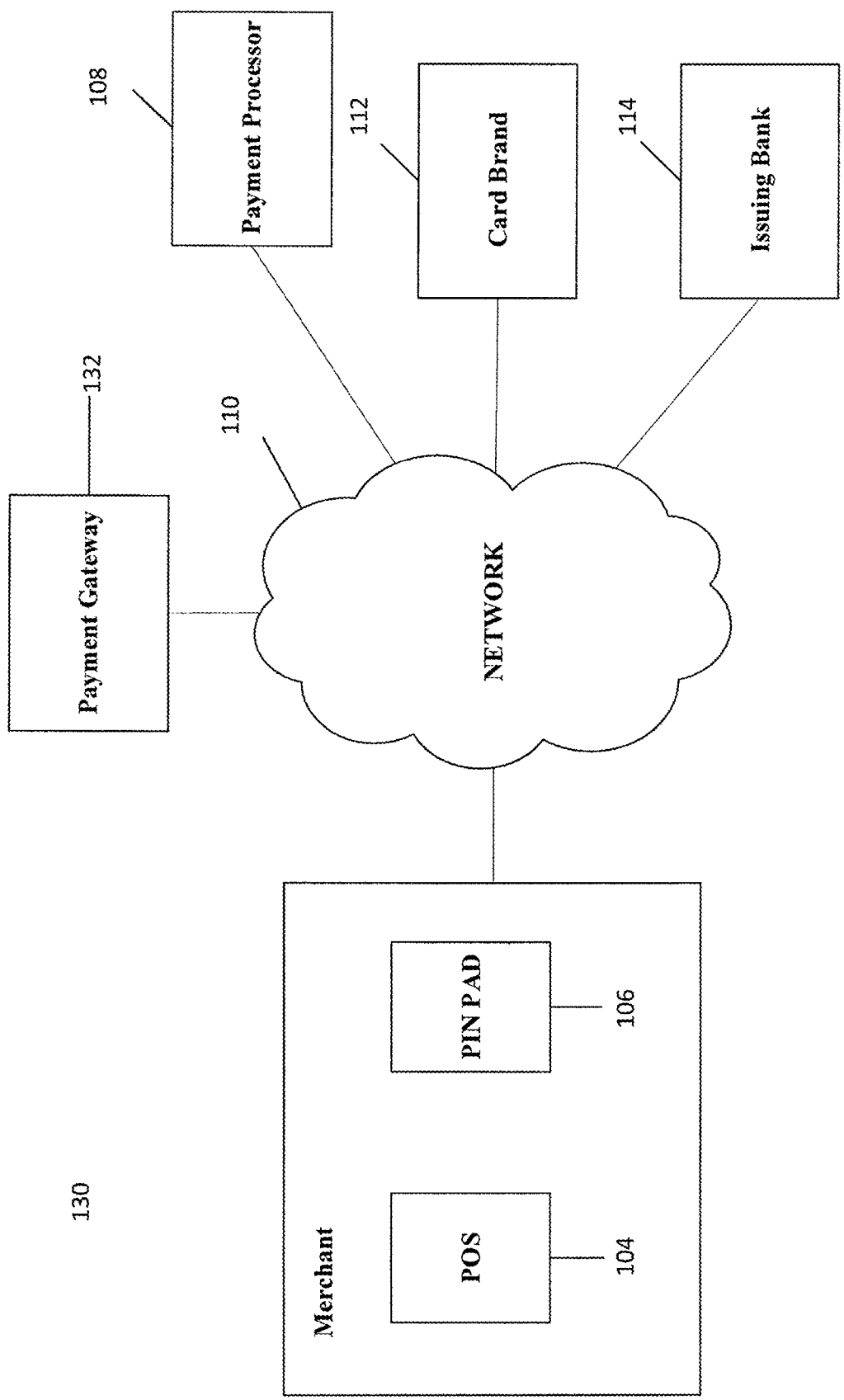
FIG. 3 is an example of a semi-integrated card processing environment, in which a payment gateway is provided instead of the merchant processor.
Figure 4:
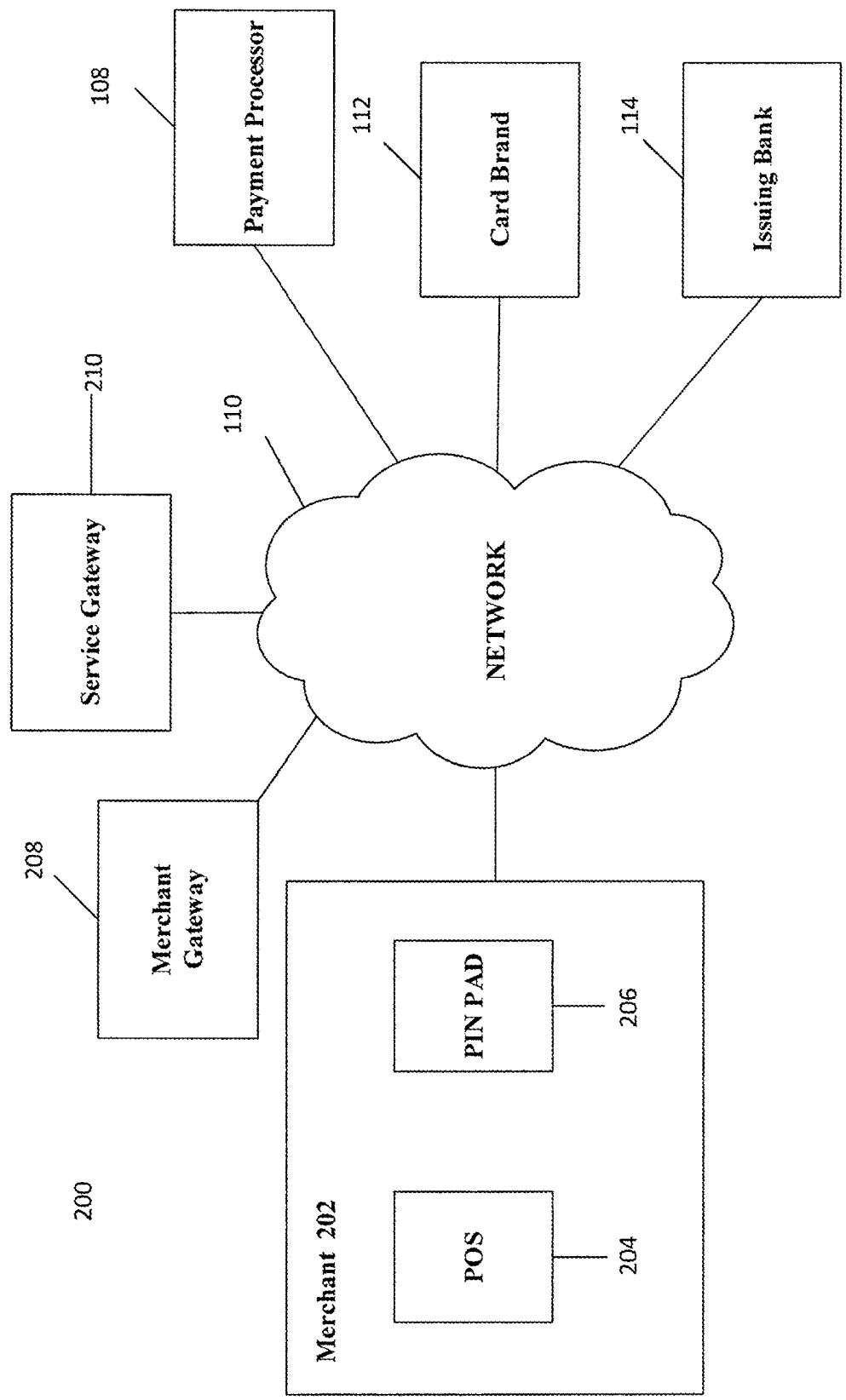
FIG. 4 is a schematic representation of an example of managed integrated payment environment with semi-integrated features, in accordance with an embodiment of the invention.

FIG. 4 is a schematic representation of an example of managed integrated payment environment 200 with semi-integrated features, in accordance with an embodiment of the invention. Components common to FIGS. 1-3 are commonly numbered. In this example, the merchant 202 includes a point-of-sale terminal ("POS") 204 and a PIN pad terminal ("PIN pad") 206. As above, pairs of POSs 204 and PIN pads 206 may be provided in respective checkout lanes, for example, at the location of the merchant 202. The managed integrated payment environment 200 includes both a merchant gateway 208 and service gateway 210.

In one example, a payment application ("App") running on the PIN pad 204 supports an integrated communication with the POS 202 and provides payment card information to the POS in order to settle a transaction. The POS 202 then assumes responsibility for processing payment by providing transaction data and card data to a merchant gateway 208. The merchant gateway 208 forwards the transaction data and card data to the payment processor 108 via the network 110, to obtain approval or denial of a transaction, in the manner described above. An approval or denial of a respective transaction is returned to the merchant gateway 208 via the network 110, as discussed above. The merchant gateway 208 provides an approval or denial message to the POS 204, via the network 110.

If the transaction is denied, then the POS 204 informs the PIN pad 206, which then typically asks for new tender. If new tender is provided, such as a different card, then the PIN pad 206 provides the card data to the POS 202, which provides the card data and other transaction information to the merchant gateway 208, and the process is repeated.

In accordance with an embodiment of the invention, the service gateway 210 is also connected to the PIN pad 206 via the network 110. The PIN pad 206 may be connected to the network 110 over the merchant's internet connection, for example. The service gateway 210 collects metadata from the transaction data and card data to provide analytics and other services/features, manages PIN pads, including provisioning of new PIN pads, and/or manages PIN pad configurations, for example, as desired by a respective merchant. The PIN pad 204 and the service gateway 206 do not perform payments processing.

Figure 5:
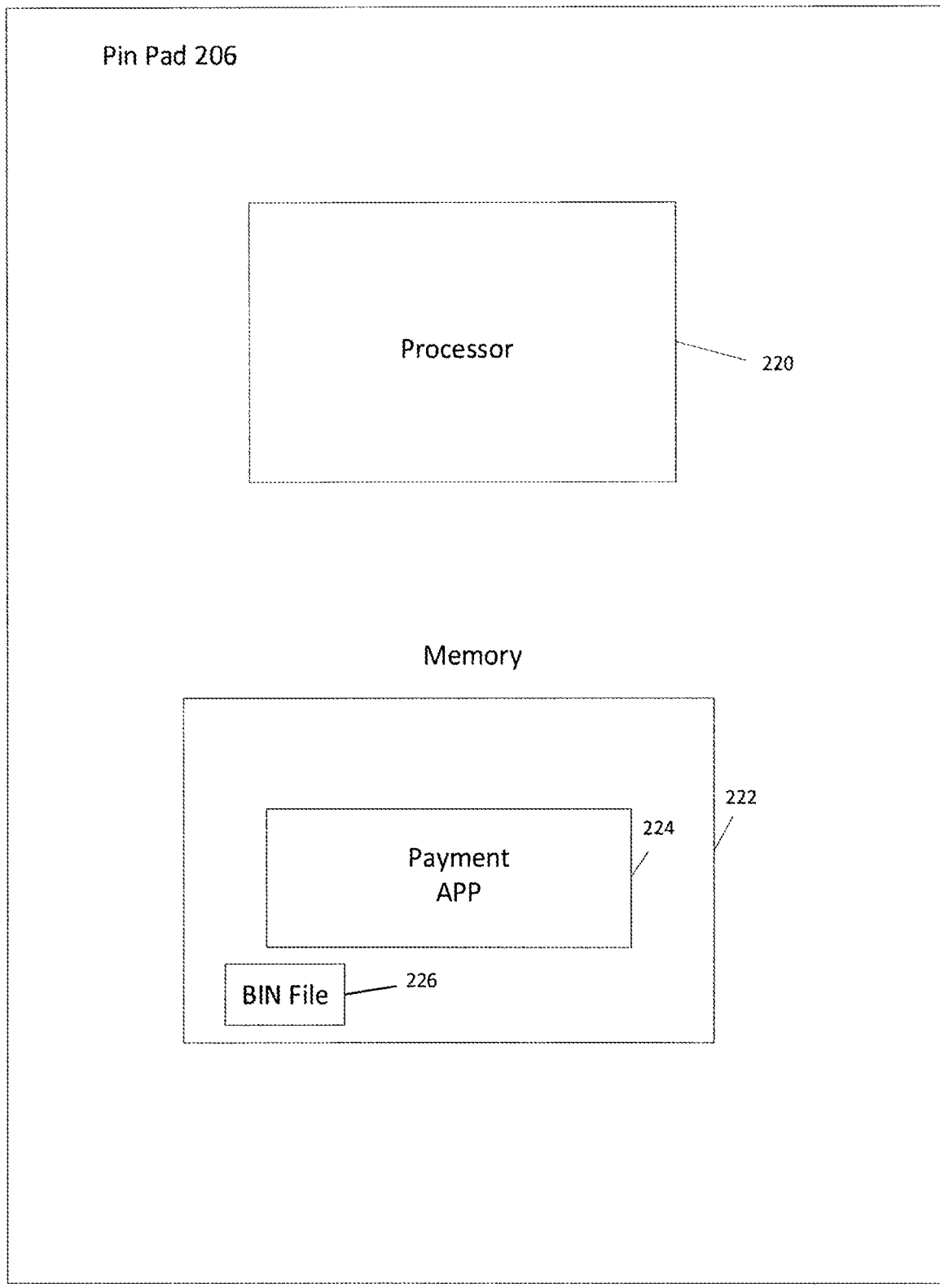
FIG. 5 is a block diagram of an example of a PIN pad that may be used in a merchant location in the managed integrated payment environment of FIG. 4, in accordance with an embodiment of the invention.

FIG. 5 is a block diagram of an example of a PIN pad 206 that may be used in a merchant location 202 in the managed integrated card payment environment 200 of FIG. 4, in accordance with an embodiment of the invention. The PIN pad 206 includes at least one processing device, such as the processing device 220, and memory 222. The processing device 220 may be a computer or a microprocessor, for example. The PIN pad 206 typically also includes a magnetic stripe reader (not shown) to read data on the tracks of a magnetic stripe on a card. The PIN pad 206 may also include a reader (not shown) to receive and interact with an EMV card.

A payment application ("payment App") 224 is stored in the memory 222 of the PIN pad 206. The payment App 224 controls operation of the processor 220 of the PIN pad 206, including providing card data collected from a card and transaction data received from the POS 204, and providing the data to the service gateway 210. The card data and transaction data may be encrypted prior to being sent to the service gateway 210. The payment App 224 also provides card data the POS 204. The card data provided to the POS 204 is also be encrypted by the payment App 224, as discussed below. The payment App 224 may also provide a personalized checkout experience to a customer including the identification of relevant loyalty offers/discounts through interaction with the service gateway 210. Such offers/discounts may be applied by the PIN pad 206 and an adjusted total is then provided to the POS 204, for example. Alternatively, the service gateway 210 applies an offer and a modified purchase total to the PIN pad 206, which informs the POS 204 of the updated purchase total. In another example, the PIN pad 206 provides the offer from the service gateway 210 to the POS 204, which modifies the purchase total in light of the offer and informs the PIN pad 206 of the modified total. The PIN pad 206 notifies the service gateway 210 of the purchase total.

The payment App 224 may be downloaded to the PIN pad 206 of the merchant 202 by the service gateway 210 after the merchant registers with the service gateway, for example. The PIN pad terminals 130 may be a Verifone MX915 or Verifone MX925, available from Verifone Holdings, Inc., San Jose California, or an Ingenico iSC250 or Ingenico iSC480, available from Ingenico Solutions, Rowlands Castle, England, for example.

Figure 6:
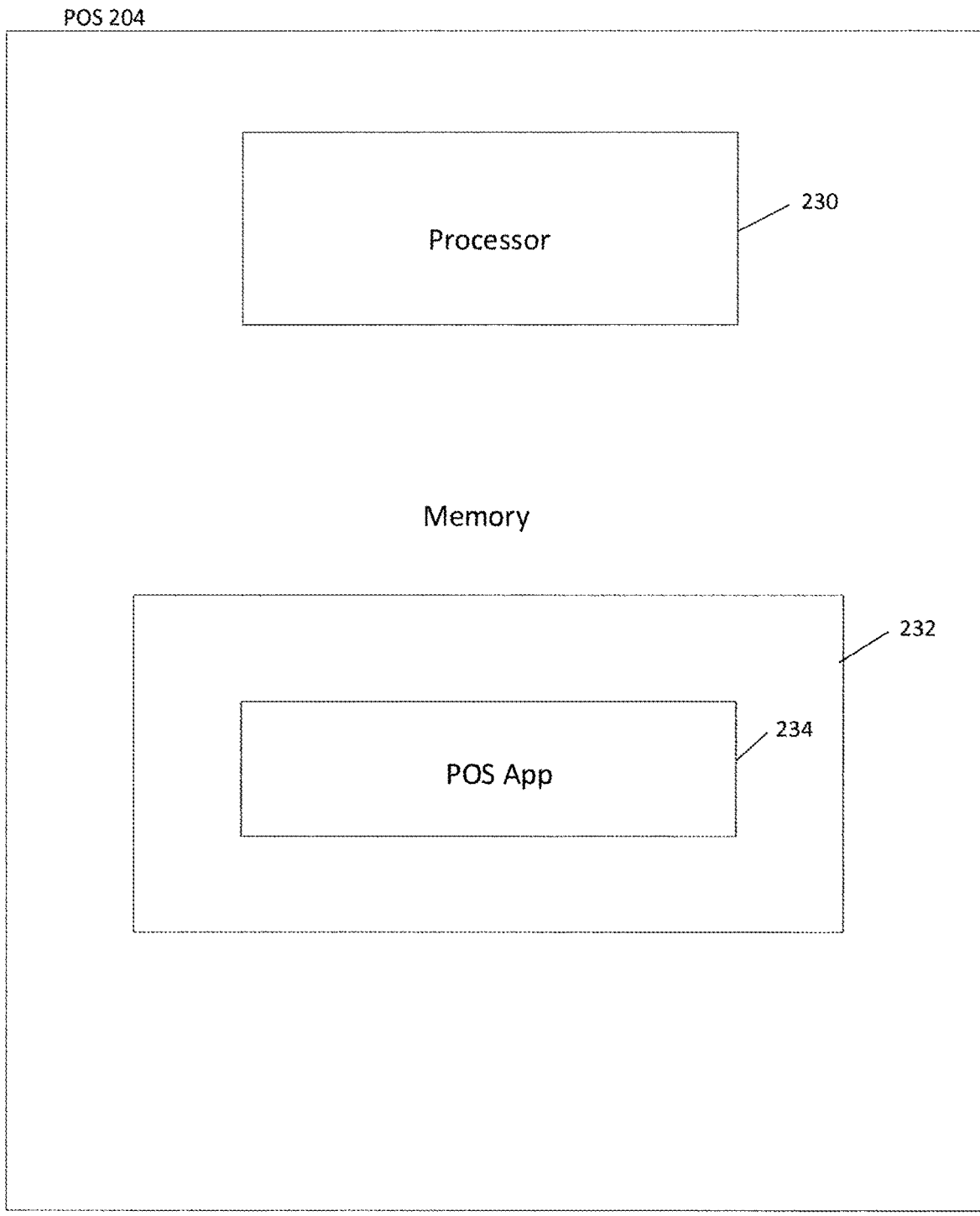
FIG. 6 is a block diagram of an example of a POS that may be used in a merchant location in the managed integrated payment environment of FIG. 4, in accordance with an embodiment of the invention.

FIG. 6 is a block diagram of an example of a POS 204 that may be used in a merchant location in the managed integrated card payment environment 200 of FIG. 4, in accordance with an embodiment of the invention. The POS 204 includes at least one processing device, such as the processing device 230, and memory 232. The processing device may be a computer or microprocessor, for example. A POS App 234 is stored in the memory 232, to control operation of the POS 204. The POS App software may include one or more Applications ("Apps") that may be provided by third parties, including the supplier of the POS 204, for particular purposes known in the art. The POS 204 also includes one or more input devices, such as a keypad and/or a scanner, a display, and other features necessary to operate as a POS to check out customers, which are not shown.

The POS terminals may be a SurePOS ACE, available from Toshiba Global Commerce Solutions, Durham, North Carolina; a LOC Store Management Suite, available from DCR, Point of Sales Systems, Nashville, Tennessee; or a RORC Point-Of-Sale, available from Quality Business Systems, Sacramento, California, for example. Suitable POSs are also available from NCR, Duluth, Georgia; IT Retail, Riverside, California; Microsoft Dynamics, Redmond Washington, for example.

Figure 7:
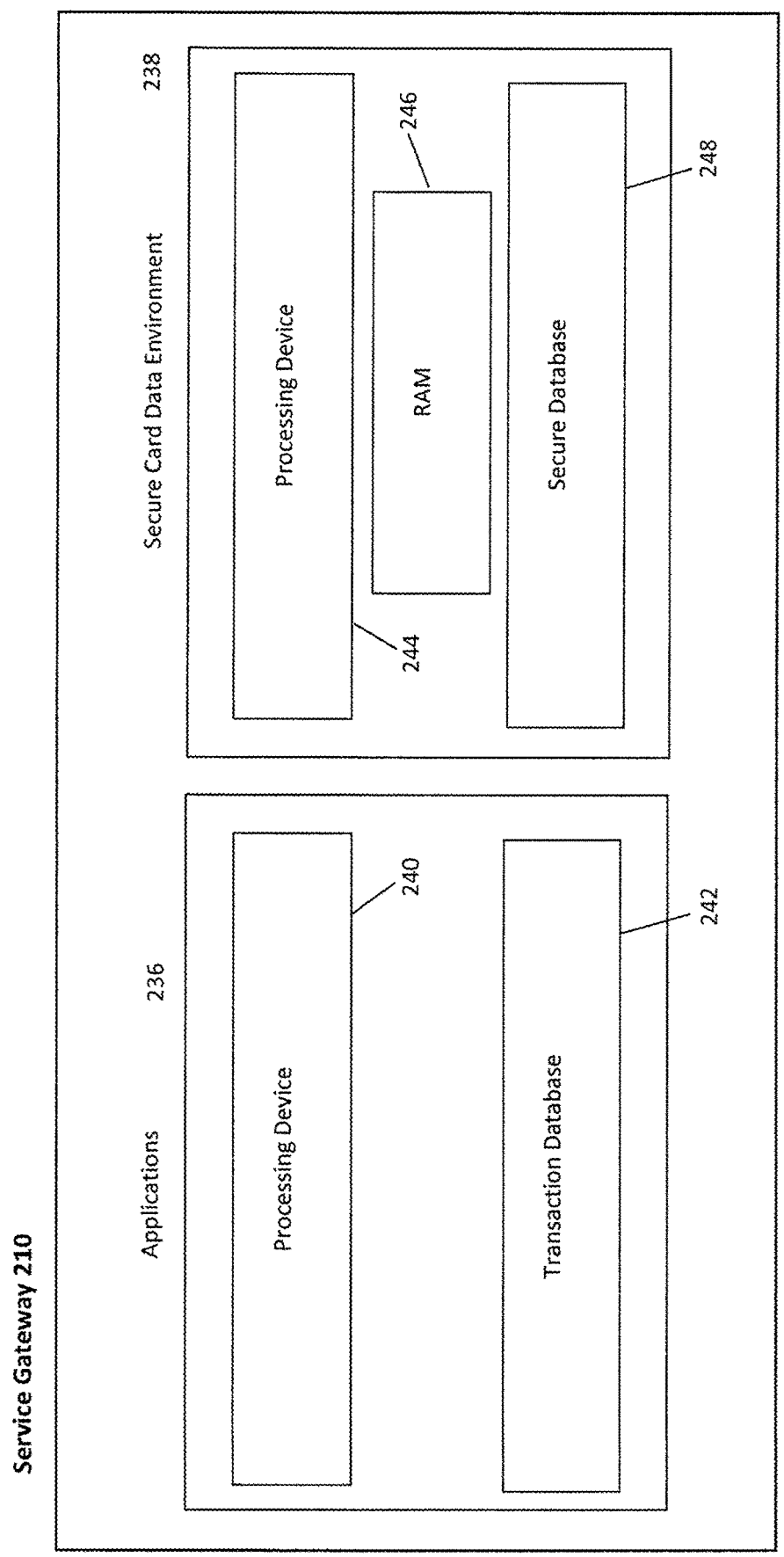
FIG. 7 is a block diagram of an example of the service gateway of FIG. 4.

FIG. 7 is a block diagram of an example of a service gateway 210, in accordance with an embodiment of the invention. The service gateway 210, in this example, includes an applications server 236 and a secure card data environment 238. The applications server 236 comprises at least one processing device 240 and at least one database, including a transactions database 242. The processing device 240 may be a computer or microprocessor, for example. The applications server 236 may provide customer and merchant analytics and other service gateway functions described herein. Encrypted card numbers of customers with accounts with the service gateway 210 may be stored in the transaction database 242 for use by applications server 236, as described, for example, in U.S. patent application Ser. No. 15/788,729, which was filed on Oct. 19, 2017, is assigned to the present invention and is incorporated by reference herein.

The secure card data environment ("SCDE") 238 processes sensitive information, such as card and transaction data, as is also described in U.S. patent application Ser. No. 15/788,729. The SCDE 238 comprises at least one processing device 244, volatile memory 246, such as random access memory ("RAM"), and a secure database 248. As above, the processing device 280 may be a computer or microprocessor, for example.

In one example, to provide extra security for the encrypted data stored in the secure database 248, only the processing device 244 can access the secure database 248, and only the applications server 236 can access the processing device 244. To further protect decrypted sensitive information, such information may only be stored in RAM 290 or other volatile memory and may be deleted after use. The processing device 244 may use the RAM 246 or other such memory (not shown) while performing calculations and other functions, as described below. The secure handling of card data is discussed in more detail in U.S. patent application Ser. No. 15/788,729.

Figure 8A:
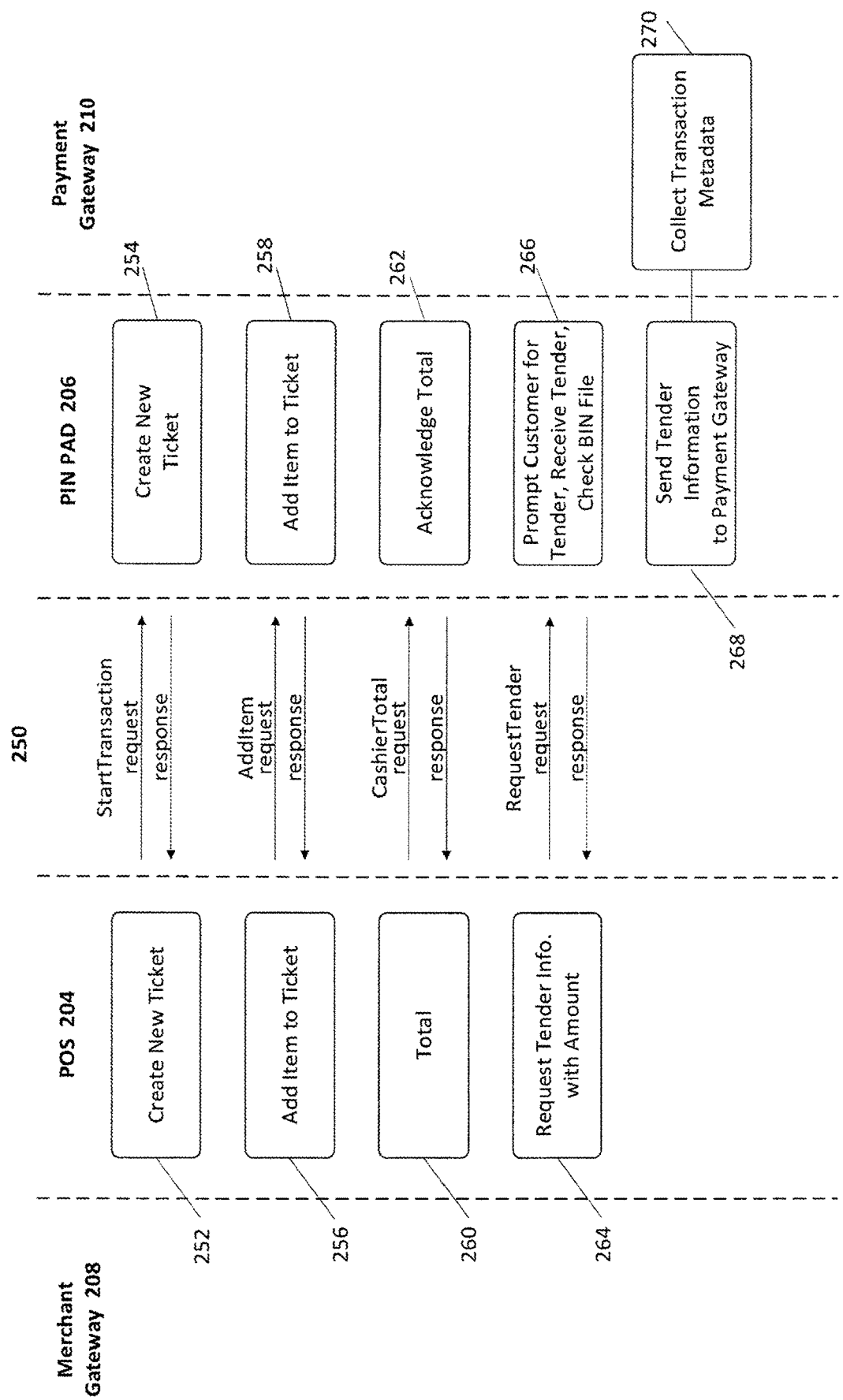
FIGS. 8A-8b show a flowchart of an example of a method for processing card transactions, by the managed integrated card payment environment of FIG. 4, in accordance with an embodiment of the invention.
Figure 8B:
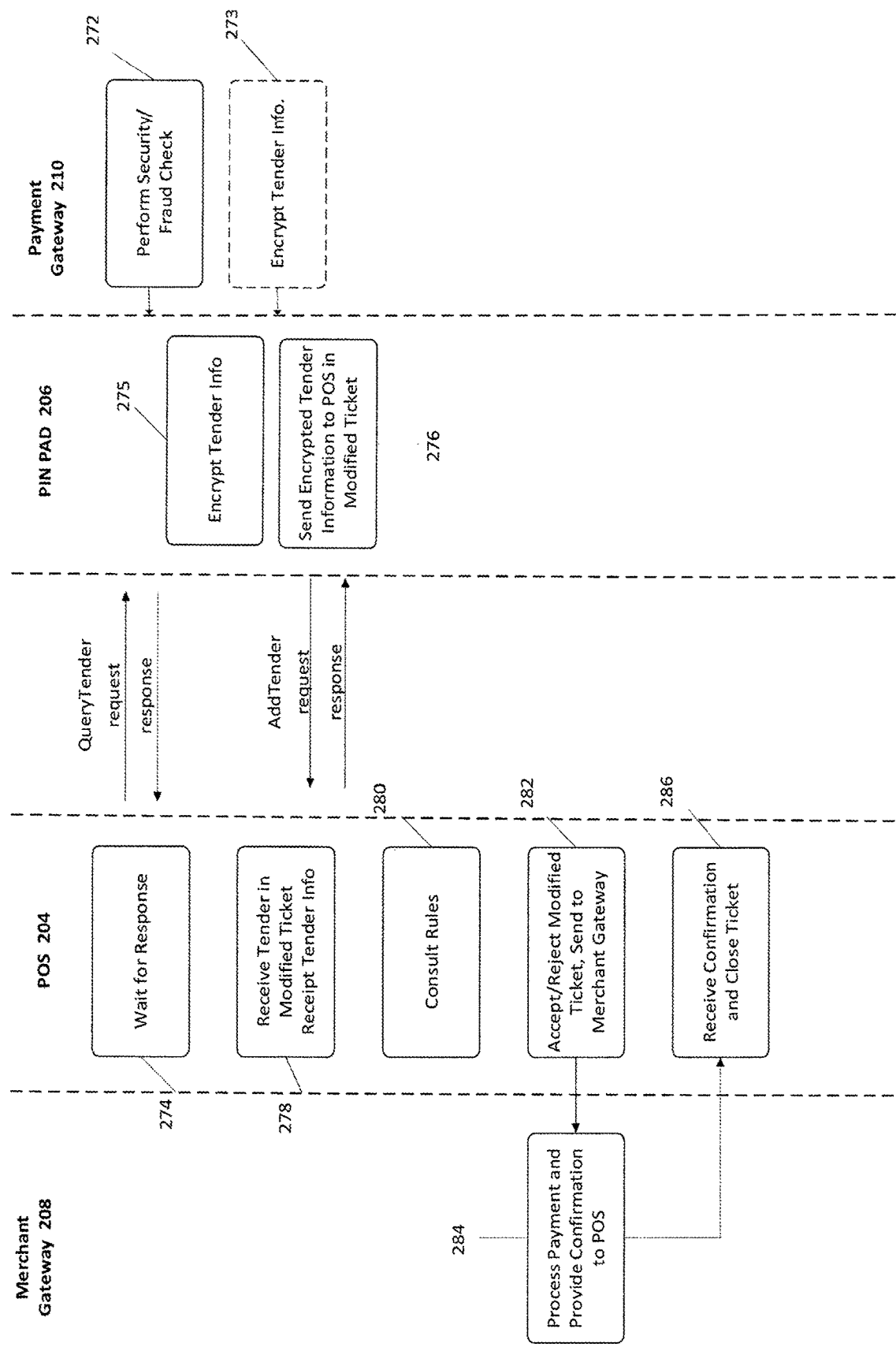

FIGS. 8A-8b show a flowchart 250 of an example of a method for processing card transactions, by the managed integrated payment environment of FIG. 4, in accordance with an embodiment of the invention. Functions of the PIN pad are performed by the processor 220 under the control of the payment App 220. Functions of the POS 204 are performed by the processor 230 of the POS 204 under the control of the POS App 224.

The transaction process starts in Step 252, when a customer brings one or more items for purchase to a POS, such as the POS 204 of FIG. 4. The POS 204 creates a new ticket or record for a first item being purchased, in Step 252. The POS 204 then sends a StartTransaction request message to a PIN pad, such as the PIN pad 206, to create a corresponding new ticket. The tickets include the cost of the first item and may also include the name of the item and/or an Item ID (UPC/SKU), for example. The PIN pad 206 sends a confirmation response to the POS 204 when the ticket is created, in Step 254.

If the customer purchases a second item, the cost of the second item is added to the ticket by the POS 204 and an AddItem request message is sent to the PIN pad 206, in Step 256. The PIN pad 206 adds the transaction data to its ticket in response to the request, and sends a confirmation response, in Step 258.

If the second item is the last item, then the POS 204 totals the prices of the two items generates and sends a CashierTotal request message to the PIN pad 206, in Step 260. The PIN pad 206 updates its ticket to include the new total in response to the request and sends an acknowledgment response to the POS 204, in Step 262. If the second item is not the last item, then Step 256 is repeated until all items have been processed by the POS 104 and added to the ticket.

In Step 264, a RequestTender request is sent by the POS 204 to the PIN pad 206, including a request for tender and the amount of the purchase totaled by the POS.

In response to the RequestTender request message, the PIN pad 206 prompts the customer for tender, receives the tender, and confirms receipt of the RequestTender request message, in Step 266. The PIN pad 206 receives the tender in the form of a credit, debit, gift card, or electronic benefit card, for example, and reads data from the card. The read data includes the card number. The read data may also include an expiration date, CVV (security) code, and/or EMV data/tags and cryptograms from a smart card, for example. If the customer is using a phone App as tender, the PIN pad 206 would receive a QR code sent by the phone, which may include the card number, CVV, etc., as is known in the art. The PIN pad 206 may also search the BIN file 226 stored in the memory 222, as shown in FIG. 5, to identify the card brand 112 and issuing bank 114 of the card, as discussed further below. The card brand 112 and issuing bank 114 are added to the ticket in Step 266.

In accordance with an embodiment of the invention, the PIN pad 206 sends the tender data or information and the transaction data on the ticket to the service gateway 210, in Step 268. The tender data and transaction data may be sent to the service gateway in an encrypted HTTPS envelope, as is known in the art. The service gateway 210 collects transaction metadata in Step 370 for use in one or more manners discussed herein. The service gateway 210 does not, however, forward the card and transaction data to the payment processor 108 for further validation and approval, as in the non-integrated payment processing environment in 100 of FIG. 1.

After Step 270, the process continues in FIG. 8B. The service gateway 210 may perform an optional security and fraud check in Step 272, as discussed further below. If the service gateway performs such a security/fraud check, the PIN pad 204 waits for a confirmation from the service gateway 210 that the fraud/security check has been passed. If the service gateway 210 instructs the PIN pad 206 that tender should not be accepted, then the PIN pad 206 asks for a different tender. The service gateway 210 may also optionally encrypt the tender data, in Step 273.

After sending the RequestTender request message to the PIN pad 206 in Step 264, the POS 204 periodically sends a QueryTender request message to the PIN pad, in Step 274. When the PIN pad 206 receives confirmation from the service gateway 210 that the tender passes the fraud/security check, if performed, the PIN pad 206 may encrypt the tender data, in Step 275 (if the service gateway 210 has not encrypted or is not configured to encrypt the tender data).

The PIN pad 206 forms a modified ticket including the optionally encrypted tender information and forwards the modified ticket to the POS 204 in an AddTender request message, in Step 276. The POS 204 responds to the AddTender request message in Step 278.

After receiving the tender information in Step 278, the POS 204 may consult stored rules, in Step 280. The rules may relate to security requirements of the merchant 202, such as not accepting known fraudulent cards and applying card preferences, such as not accepting American Express and/or international cards, for example. If the rules are passed, then the modified ticket is accepted by the POS 204 and sent to the merchant gateway 208, in Step 282. If any rule is not passed, then the POS 204 may reject the modified ticket and send another RequestTender message to the PIN pad 206 to cause the PIN pad to request a different tender. Steps 266-282 are then repeated.

The POS 204 then decrypts the tender, or sends the modified ticket to the merchant gateway 208 including the encrypted card data, in Step 282.

The merchant gateway 208 receives the modified ticket, decrypts the tender data, if necessary, and processes the payment by sending the modified ticket to the payment processor 108 for validation, in Step 284. If validated, the service gateway 210 sends the validated, modified ticket to the card brand 112 for authentication and approval. If authenticated and approved, the card brand 112 sends the modified ticket to the issuing bank 114 for further authentication and approval, as discussed above. If the authenticated by the issuing bank 114, the modified ticket is returned to the merchant gateway 208, via these same institutions and the network 110, as discussed above. The modified ticket is sent from one party to the next via the network in an encrypted HTTPS envelope, for example.

The merchant gateway 208 returns the modified ticket to the POS 204 with approval or denial codes, as provided by the payment processor 108, card brand 110, and/or issuing bank 114. The new ticket is received by the POS 204, in Step 286. If approved, the POS 204 closes the ticket and the transfer is completed. If the ticket is denied, the POS 204 sends another RequestTender message to the PIN pad 208, as in Step 264. The PIN pad 208 would then prompt the customer for a new tender, in Step 266, and the process continues as discussed above.

Security and Fraud Check

As discussed above with respect to Step 272 of FIG. 8B, the service gateway 210 may perform security and fraud checks on the tender data and transaction data for the merchant 202, and other parties to the transaction, such as the local store, the merchant gateway 208, the card brand 112, or the issuing bank 114, for example. Each party may provide security and fraud warnings associated with respective cards. Each file may contain a list of known fraudulent cards, such as stolen cards or card numbers, for example. Such information may be provided to the service gateway 210 by the card brand 112 and the issuing bank 114, for example.

In one example, a respective party may require additional verification of the identity of the customer associated with the card and request that a phone number or identification be provided, for example. In another example, a party may place a limit on a transaction amount that can be charged to a respective card. Such restrictions may be provided in one more lists and/or tables maintained by the service gateway 210 in the transactions database 242 or other such storage, in association with the party requesting the restriction, for example. The service gateway 210 may maintain files for each party, which may be stored in the transaction database 242. Maintaining and updating such lists and tables for each of the parties involved in the transaction, and performing such checks would be a significant burden to the merchant gateway 208.

When the service gateway 210 receives the card data and transaction data from the PIN pad 206, the processing device 240 checks each file to determine whether the card data indicates that the card or the combination of card data and transaction data should not be processed. If the card number is not found on a list of fraudulent card numbers and there are no limitations on transaction amounts, then the processing device 240 informs the Pin pad 206 to continue processing the transaction with the received tender, in Step 272. If the card is found to be fraudulent or the transaction amount exceeds a limit, for example, the Pin pad 206 is instructed to request new tender for all or part of the transaction amount, in Step 272.

EMV Kernel Modifications and Improved Card Read Times

Using the managed, integrated payment approach allows for improvements to the PIN pad App 224 and kernel software to be utilized by the merchant 202, for processing smart payment cards including an integrated circuit. In this example, the merchant 202 can use an EMV Kernel to improve card read times and provide a good customer experience, while maintaining the integrated payments model. An improved EMV Kernel is described in U.S. patent application Ser. No. 15/699,090 (U.S. Patent Publication No. 2018/0068303), which was filed on Sep. 8, 2017, is assigned to the assignee of the present application, and is incorporated by reference herein. In one example of a managed integrated payment environment 200 in accordance with an embodiment of the invention, where the PIN pad 206 includes an EMV Kernel for faster processing of smart cards, the PIN pad 206 can send a message to the POS 204 to request a cryptogram and issue scripts from the merchant gateway 208, if a full online transaction is determined to be required by the PIN pad 206, as described in in U.S. patent application Ser. No. 15/699,090. In response to the message, the POS 204 sends the purchase or transaction total to the merchant gateway 208, which requests the cryptogram and issue scripts, from the issuing bank 114. The cryptogram and issuing scripts, if any, are returned to the merchant gateway 114, which sends them to the POS 204.

The POS 204 sends them to the PIN pad 206, which continues the process described in in U.S. patent application Ser. No. 15/699,090. The POS 204 may also perform other aspects of the fast smart card processing described in U.S. patent application Ser. No. 15/699,090.

EFT Management

In the traditional integrated environment 120 of FIG. 2, for example, the POS 104 is responsible for performing card brand 112 and issuing bank 114 identification based on the card data. A Bank Identification Number ("BIN") range correlating ranges of BIN numbers with card brands 112 and issuing banks 114 is typically stored in the memory 232 of the POS 204 in a database, for example, as is known in the art. In one example, the first 6-9 digits of the card's primary account number ("PAN") are examined to determine the appropriate card brand 112 and issuing bank 114 for routing purposes. The BIN file requires frequent updates and modifications by the merchant 102, as is known in the art. Since such updates/modifications are typically manually downloaded by the merchant 102, this can be a significant burden to the merchant 102 and cause POSs 204 to be offline. Updates and modifications are typically provided by the card brands 112 and issuing banks 114.

In accordance with an embodiment of the invention, the BIN file 226 is stored in the memory 222 of the PIN pad 204, as shown in FIG. 5. Card brand 112 and issuing bank 114 identification is managed by the at least one processing device 220 of the PIN pad 206, under the control of the payment App 224 or other such App stored in the memory 222 of the PIN pad. Modifications and updates to the BIN file may be downloaded directly to the respective PIN pad 206 via the network 110 by the service gateway 210, relieving the merchant 202 of a significant burden.

In one example, when the PIN pad 206 receives tender in Step 266 of the process of FIG. 8A, the processing device 220 reads the PAN, and derives the BIN for the card from the first 6-9 digits of the PAN. The processing device 220 then searches the BIN file 226 stored in the memory 222 for the card brand 112 and issuing bank 114 corresponding to the derived BIN for the card. The card brand 112 and issuing bank 114 are then added to the modified ticket, which is provided to the POS 204, also in Step 266. The payment processor 108 forwards the ticket to the appropriate card brand 112, based on the card brand identified in the ticket. Similarly, the card brand 112 send the ticket to the appropriate issuing bank 114 based on the issuing bank identified in the ticket.

Provisioning the BIN file 226 remotely to the PIN pad 206 could increase flexibility around card identification, facilitate encouragement of particular cards and discourage use of others, and allow a merchant 102 to customize payments, for example.

Device Management

In accordance with an embodiment of the invention, the service gateway 210 provides device and configuration management tools to fully manage and configure PIN pads 206 at a merchant location. Examples of such device and configuration management tools include the user experience, such as fonts, logos, color, etc., displayed to a customer by the PIN pad, feature configuration (cashback amount, transaction signature threshold, supported tender types, etc.), and remote software updates, for example.

Software updates may be provided by the service gateway 210 via the network 110 and the merchant's network or the merchant's connection, such as the merchant's internet connection, to the network 110. In such a configuration it is important to ensure that configuration settings of the payment App 224 of the PIN pad 206 align with configurations on the POS 204. Examples of configuration settings include thresholds, such as signature thresholds, maximum cash back amount, maximum sale amount, maximum refund amount, tax rate, etc.

Customer Identification for Sign Up, Tokens, Loyalty, and Offers

The service gateway 210 may perform analytics and customer identification as a result of the integration between the PIN pad 206 and the service gateway 210, in accordance with an embodiment of the invention. A unique account for each "user" who presents a payment card by using the card as a customer identifier along with associated information such as transaction history, email address, etc., may be created when a customer presents their card to the PIN pad 206 in Step 266 of FIG. 8A, for example. The next time the customer uses their credit card at that merchant 102, the service gateway 210 can authenticate the customer to the service gateway. The service gateway 210 can then access the customer's account and can provide appropriate services. Examples of such services include: returning user email or collecting a new email; returning or associating a merchant loyalty identification; generating a token for the card; returning offers for the customer to the PIN pad 206; and/or automatically interacting with an offer/coupon infrastructure of a merchant 202 to apply eligible discounts and offers to a current transaction, for example, as discussed above.

Customer analytics may also be provided from the service gateway 210 to the merchant 202, described in U.S. Patent Publication No. 2014/0222668 A1, for example, which was filed on Apr. 11, 2014, and is incorporated by reference herein.

Encryption

To adhere to PA-DSS requirements (and security best practices), it is critical that card data leaving the PIN pad 206 be encrypted. The processing device 230 of the PIN pad 206 may pursue one or more of the following encryption options, under the control of the payment App 224 or other software, in accordance with an embodiment of the invention.

Native Encryption

In one example, the payment App 224 of the PIN pad 206 may implement an existing encryption product already natively supported by the PIN pad 206, such as Verishield on a Verifone PIN pad, available from Verifone, Inc., San Jose, California, for example. Externally generated keys may be used to encrypt the card data using format preserving encryption. The encryption keys maybe either be injected on the PIN pad 206 or remotely deployed to the service gateway 210 via an agreed-upon method. The PIN pad 206 then encrypts the card data based on the encryption key, in Step 275 of FIG. 8B and the POS 204 decrypts the encrypted card data in Step 278 of FIG. 8B, based on the encryption key.

RSA Encryption

The service gateway 210 may also generate symmetric keys, rotate them into the PIN pad 206, and share them with the merchant gateway 208. This would provide an equivalent level of security to interfacing with a third-party security product such as Verishield, available from Verifone, Inc., San Jose California, for example. Keys in this example are controlled by the service gateway 210 and are provided to the PIN pad 206 for use by the payment App 224 or another such App.

The service gateway 210 may also generate asymmetric keys and either import a public key from the merchant gateway 208 via the network 110 or export the private key to the merchant gateway 208. In this example, the merchant gateway 208 is configured to modify the POS 206 to use such keys for encryption and decryption operations. Alternatively, a side channel from the service gateway 210 to the POS 204 may be used to provide the keys. The PIN pad 206 then encrypts card data based on the public or private key, in Step 275 of FIG. 8B and the POS 204 decrypts the encrypted card data in Step 278 of FIG. 8B, based on the private or public key, for example. While complex, this is a very secure solution for the merchant 202.

In addition, private keys may be generated and encrypted by a cloud based key management system (KMS) or hardened security module (HSM), such as the Amazon KMS or HSM, as described in U.S. patent application Ser. No. 15/788,729, which was filed on Oct. 19, 2017, is assigned to the assignee of the present application and is incorporated by reference herein. The encrypted private keys may be exported to the merchant gateway 208, for example. Multi-region key backup may also be provided, as described in U.S. patent application Ser. No. 15/788,729. As above, the PIN pad 206 encrypts card data based on a public key, in Step 275 of FIG. 8B and the POS 204 or the 210 merchant gateway decrypts the encrypted card data in Step 278 of FIG. 8B, based on the private key, as described in U.S. patent application Ser. No. 15/788,729.

Managed, Fully-Integrated Payments with a Legacy Interface

Figure 9:
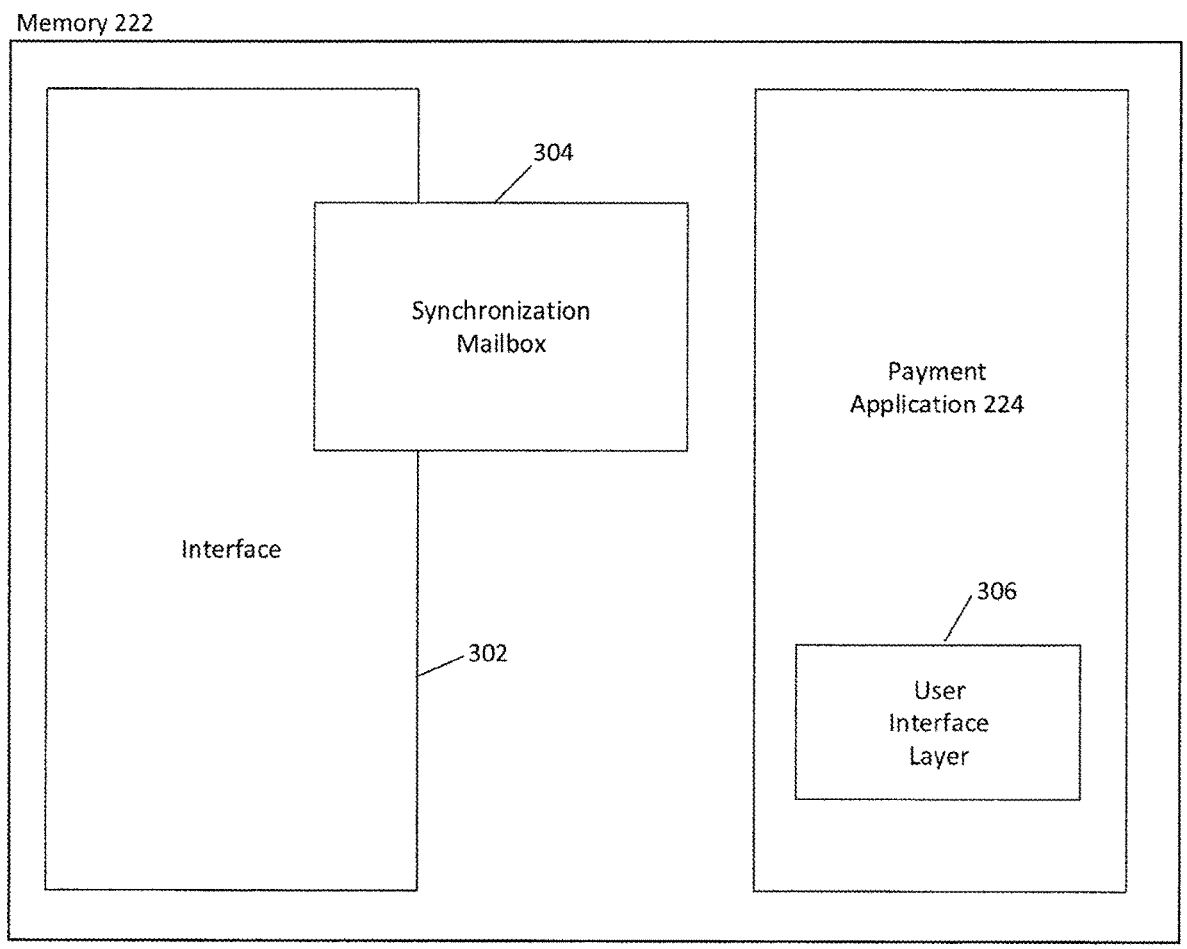
FIG. 9 is a block diagram of an Interface layer in the memory of the PIN pad.

Embodiments of the he managed integrated payment environment 200 depend on the POS 204 being able to exchange messages with the PIN pad 206 using a predefined protocol. In accordance with an embodiment of the invention, the PIN pad 206 includes a PIN pad Interface 302 stored in the memory 222 of the PIN pad 206, as shown in FIG. 9, which acts as an abstraction layer between the POS 204 and the PIN pad 206. The Interface 302 functions as an application that runs on the PIN pad 208 alongside the native Operating System (not shown). The Interface 302 facilitates communications between the PIN pad 206 and the POS 204 so that a merchant 202 can use managed device features provided by the service gateway 210 without any changes needed to the POS 204.

A Synchronization Mailbox 304 of the Interface 302 serves as an exchange interface between the Interface 302 and the payment App 224. The Interface 302 allows custom commands from the POS 204 to be satisfied through the use of the Synchronization Mailbox 304 by the Interface 302. A separately-defined user interface layer 306, which is controlled by the payment App 224, is also shown. The user-interface layer 306 is provided to receive data input by a customer through an input device, such as a magnetic stripe reader, EMV chip reader, and/or a keypad, and convey it to the payment App 224.

The Interface 302 also includes a protocol parser (not shown), which provides the Interface 302 with a first set of rules and logic to translate a POS request. The protocol parser may contain a set of APIs that enables the Interface 302 to translate an incoming request between the POS 204 and payment App 224, for example. The Interface 302 may be configured with a series of protocol parsers dedicated to respective request types. When the Interface 302 is presented with a request from the POS 204, it identifies the correct protocol parser needed to respond to the request appropriately, based on the type of request.

The Interface 302 also includes an Intent Map (not shown), which allows the Interface 302 to map the information or action desired by the POS 204, also referred to as POS intent, based on the native POS intent, to the expected response to the request. For example, a form request for a phone number desires a phone number in response, and prompting a customer cash back desires obtaining a cash back amount.

The Intent Map maps specific POS requests to the information desired by the POS 206 in response to that request. In this example, the Intent Map interprets each POS request and translates the request into a form/request type understood by the payment App 224. As a result, there is a unique Intent Map per PIN pad 206 that the Interface 302 runs on, which will be specific to the supported features on the respective PIN pad. If the payment App 224 has collected the desired information or data element, it is be stored in the Synchronization Mailbox 304.

In a traditional PIN pad 106, the payment App is responsible for interacting with the POS 204, as is known in the art. Below is an example of a transaction flow:

1. During the transaction, the POS 104 requests that the PIN pad 106 display a "form" to prompt the customer for a phone number;
2. The PIN pad 106 accepts this request and displays a form on the PIN pad to prompt the customer to enter a phone number (e.g., to look up a loyalty account);
3. The customer inputs their phone number;
4. The PIN pad 106 responds to the POS 104 with the phone number; and
5. The POS 104 requests the next form, such as an email prompt, a payment prompt, etc.

Figure 10:
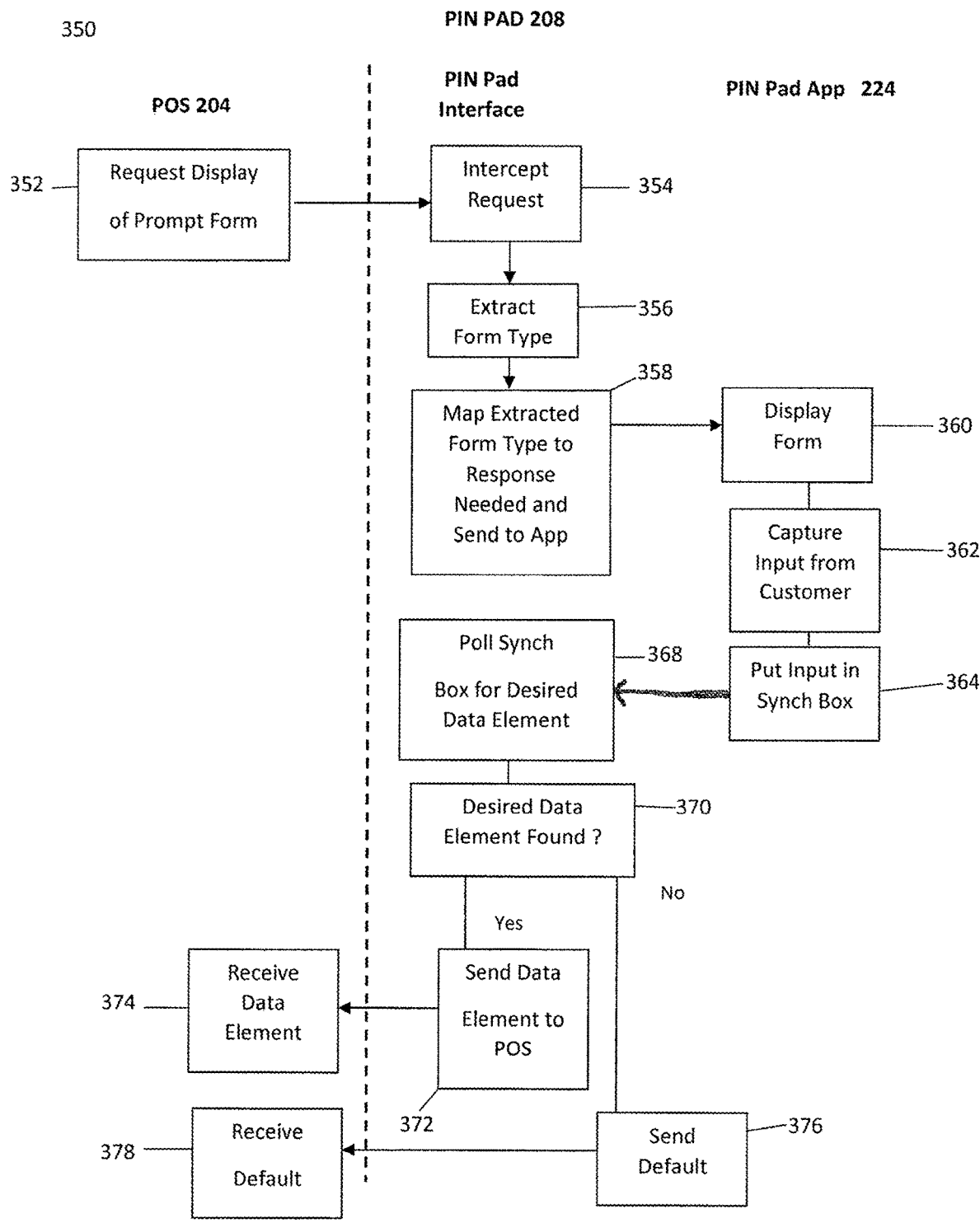
FIG. 10 is a flowchart of an example of a process performed by the PIN pad and POS, through the Interface and the payment App, in accordance with an embodiment of the invention.

FIG. 10 is a flowchart of an example of a process 350 performed by the PIN pad 206 and POS 206, through the Interface 302 and the payment App 224, in accordance with an embodiment of the invention. In this example, the POS 204 requests that the PIN pad 206 display a phone number prompt form, in Step 352. The PIN pad Interface 302 intercepts the request, in Step 354. The Interface 302 uses the protocol parser to extract the form type (the phone number in this example) and response needed from the POS request, in Step 356.

The Interface 302 uses the intent map to map the extracted form type to the response needed to satisfy the POS 204. This mapping may be based on known protocols of merchants and/or payment/terminal interactions, for example. The extracted form type and response needed are sent to the PIN pad payment App 224, in Step 358.

Meanwhile, the customer is interacting with the PIN pad 206 through the user interface layer controlled by the payment App 224. As the payment App 224 proceeds through its user interface flow, it may capture a phone number, e.g., after the customer is prompted for an email, in Step 362. The payment App 224 manages its own user experience design (UX) and interaction with the customer out-of-band with the POS 204. For example, the payment App 224 may prompt the customer to enter an email address prior to a phone number, even though the POS 204 is only configured to prompt for a phone number.

The payment App 224 places the received data element in the Synchronization Mailbox, in Step 364. The Interface 302 polls the Synchronization Mailbox to see if a data element, such as the phone number, or other requested information, is present, in Step 368. It is noted that the Interface may repeatedly poll the Synchronization box throughout the process 350, until one data element is found.

When the Interface 302 finds the desired data element (a phone number, for example), in Step 370, the data element is returned to the POS 204 in Step 372 to satisfy the initial request made in Step 352. The data element is received by the Interface 302 in Step 374.

If the Interface 302 does not find the desired data element in Step 372, the Interface provides a default response that will satisfy the POS 204, in Step 376, which is received in Step 378.

This process repeats for any other requests made by the POS 204.

At some point in the transaction, the POS 204 requests that the PIN pad 206 request card information (tender) to obtain payment for the transaction for the customer. The tender is returned to the POS 204 after the customer presents a card to the PIN pad 206 and after the appropriate card data is placed in the Synchronization Mailbox by the App. The Interface 302 repeats Steps 354-372 until the credit card information is provided to the POS 204 by the PIN pad 206 in Step 276 of FIG. 8B.

It will be appreciated by those skilled in the art that changes may be made to the embodiments described herein, without departing from the spirit and scope of the inventions, which are defined by the following claims.

We claim:

1. A method of a PIN pad device performing a transaction with a payment card comprising an integrated circuit, the method comprising:
    interacting, by the PIN pad device, with an integrated circuit on the payment card, wherein the interacting comprises reading the integrated circuit with a reader of the PIN pad device;
    determining, by a processor of the PIN pad device, a card brand, a card issuer, or a combination thereof of the payment card;
    retrieving, by the processor of the PIN pad device from a memory of the PIN pad device, a map of the integrated circuit based, at least in part, on the determined card brand, the card issuer, or the combination thereof, the map comprising one of a plurality of different maps each associated with a different card brand, card issuer, or combination of card brand and card issuer, and the map comprises locations of records that exist on integrated circuits associated with the card brand, card issuer, or combination of card brand and card issuer;
    identifying, by the processor of the PIN pad device, one or more locations of records on the integrated circuit containing a card number, card information, or a combination thereof on the integrated circuit, from the map;
    reading, with the reader of the PIN pad device, the one or more identified locations to acquire the card number, the card information, or the combination thereof; and
    using the read card number, card information, or combination thereof to complete processing of the transaction.

2. The method of claim 1, wherein the card information comprises one or more of:
    a cardholder name, a card expiration date, a customer's PIN verification Key, a PIN verification value, a card verification value, a card verification code, and signed data.

3. The method of claim 1, further comprising:
    storing information related to two or more parties comprising: processing requirements of a gateway, a card brand, a card issuer, a merchant, a store, and the payment card;
    assigning a relative priority to the two or more parties for which the information is stored; and
    determining whether to perform card validation to validate the payment card based, at least in part, on stored validation information from the two or more parties, based on the priority assigned to each of the two or more parties.

4. The method of claim 3, wherein, when it is determined not to perform card validation, the method further comprises:
    issuing a command to the integrated circuit to generate an authorization cryptogram;
    receiving the authorization cryptogram;
    determining whether a full online transaction is to be performed by the PIN pad device; and
    when the full online transaction is determined not to be performed, issuing a deferred authorization to the integrated circuit, indicating that the transaction is completed.

5. The method of claim 3, wherein, when it is determined that card validation is to be performed, the method further comprises:
    inferring public key parameters for the payment card based, at least in part, on the card information;
    retrieving the inferred public key parameters; and
    attempting to validate signed data using the retrieved public key parameters.

6. The method of claim 5, wherein, when the attempt to validate the signed data is successful, the method further comprises:
    issuing a command to the integrated circuit to generate an authorization cryptogram;
    receiving the authorization cryptogram;
    determining whether a full online transaction is to be performed by the PIN pad device; and
    when the full online transaction is not to be performed by the PIN pad device, issuing a deferred authorization to the integrated circuit, indicating that the transaction is completed.

7. The method of claim 5, wherein, when the attempt to validate the signed data is not successful, the method further comprises:
    attempting to validate the signed data with all available secure key parameters; and
    when the attempt to validate the signed data is successful, the method further comprises:
    issuing a command to the integrated circuit to generate an authorization cryptogram;
    receiving the authorization cryptogram;
    determining whether a full online transaction is to be performed by the PIN pad device; and
    when the full online transaction is not to be performed by the PIN pad device, issuing a deferred authorization to the integrated circuit, indicating that the transaction is completed.

8. The method of claim 3, further comprising:
    determining that card validation is not to be performed;
    issuing a command to the integrated circuit to generate an authorization cryptogram;
    receiving the authorization cryptogram;
    determining that a full online transaction processing is to be performed by the PIN pad device based, at least in part, on transaction related information the stored information related to the two or more parties, based on the priority assigned to each of the two or more parties;
    sending a received transaction total to a payment gateway, via a network, for approvals; and
    receiving an issuer response including an approval or denial, a response cryptogram of an issuing bank, and issuer scripts; and loading the issuer scripts on the integrated circuit to complete the transaction.

9. A device for performing a transaction with a payment card comprising an integrated circuit, the device comprising:
a storage; and
a processor coupled with the storage to:
  interact with an integrated circuit on the payment card, wherein the interacting comprises reading the integrated circuit with a reader of the device;
  determine a card brand, a card issuer, or a combination thereof of the payment card;
  retrieve, from the storage, a map of the integrated circuit based, at least in part, on the determined card brand, the card issuer, or the combination thereof, the map comprising one of a plurality of different maps each associated with a different card brand, card issuer, or combination of card brand and card issuer, and the map comprises locations of records that exist on integrated circuits associated with the card brand, card issuer, or combination of card brand and card issuer;
  identify one or more locations of records on the integrated circuit containing a card number, card information, or a combination thereof on the integrated circuit, from the map;
  read, using the reader, the one or more identified locations to acquire the card number, the card information, or the combination thereof; and
  using the read card number, card information, or combination thereof to complete processing of the transaction.

10. The device of claim 9, wherein the card information comprises one or more of:
a cardholder name, a card expiration date, a customer's PIN verification Key, a PIN verification value, a card verification value, a card verification code, and signed data.

11. The device of claim 9, further comprising the processor configured to:
  store information related to two or more parties comprising: processing requirements of a gateway, a card brand, a card issuer, a merchant, a store, and the payment card;
  assign a relative priority to the two or more parties for which the information is stored; and
  determine whether to perform card validation to validate the payment card based, at least in part, on stored validation information from the two or more parties, based on the priority assigned to each of the two or more parties.

12. The device of claim 11, wherein, when it is determined not to perform card validation, the processor is further configured to:
  issue a command to the integrated circuit to generate an authorization cryptogram;
  receive the authorization cryptogram;
  determine whether a full online transaction is to be performed; and
  when the full online transaction is determined not to be performed, issuing a deferred authorization to the integrated circuit, indicating that the transaction is completed.

13. The device of claim 11, wherein, when it is determined that card validation is to be performed, the processor is further configured to:
  infer public key parameters for the payment card based, at least in part, on the card information;
  retrieve the inferred public key parameters; and
  attempt to validate signed data using the retrieved public key parameters.

14. The device of claim 13, wherein, when the attempt to validate the signed data is successful, the processor is further configured to:
  issue a command to the integrated circuit to generate an authorization cryptogram;
  receive the authorization cryptogram;
  determine whether a full online transaction is to be performed; and
  when the full online transaction is not to be performed, issue a deferred authorization to the integrated circuit, indicating that the transaction is completed.

15. The device of claim 11, wherein the processor is further configured to:
  determine that card validation is not to be performed;
  issue a command to the integrated circuit to generate an authorization cryptogram;
  receive the authorization cryptogram;
  determine that a full online transaction processing is to be performed based, at least in part, on transaction related information the stored information related to the two or more parties, based on the priority assigned to each of the two or more parties;
  send a received transaction total to a payment gateway, via a network, for approvals; and
  receive an issuer response including an approval or denial, a response cryptogram of an issuing bank, and issuer scripts; and
  load the issuer scripts on the integrated circuit to complete the transaction.

16. A non-transitory computer-readable medium comprising code that, when executed by a processor of a PIN pad device, causes the PIN pad device to perform operations, comprising:
  interacting, by the PIN pad device, with an integrated circuit on the payment card, wherein the interacting comprises reading the integrated circuit with a reader of the PIN pad device;
  determining, by a processor of the PIN pad device, a card brand, a card issuer, or a combination thereof of the payment card;
  retrieving, by the processor of the PIN pad device from a memory of the PIN pad device, a map of the integrated circuit based, at least in part, on the determined card brand, the card issuer, or the combination thereof, the map comprising one of a plurality of different maps each associated with a different card brand, card issuer, or combination of card brand and card issuer, and the map comprises locations of records that exist on integrated circuits associated with the card brand, card issuer, or combination of card brand and card issuer;
  identifying, by the processor of the PIN pad device, one or more locations of records on the integrated circuit containing a card number, card information, or a combination thereof on the integrated circuit, from the map;
  reading, with the reader of the PIN pad device, the one or more identified locations to acquire the card number, the card information, or the combination thereof; and
  using the read card number, card information, or combination thereof to complete processing of the transaction.

* * * * *